(12) United States Patent
Yu et al.

(10) Patent No.: US 7,980,725 B2
(45) Date of Patent: Jul. 19, 2011

(54) SOLAR ENERGY STREET LAMP STRUCTURE WITH AIR PASSAGEWAY

(75) Inventors: Ching-Hue Yu, Jhubei (TW); Chih-Chen Chen, Jhubei (TW)

(73) Assignee: United Lighting Opto-Electronics Inc., Hsinchu (TW)

( * ) Notice: Subject to any disclaimer, the term of this patent is extended or adjusted under 35 U.S.C. 154(b) by 195 days.

(21) Appl. No.: 12/510,320

(22) Filed: Jul. 28, 2009

(65) Prior Publication Data

US 2010/0302764 A1 Dec. 2, 2010

(30) Foreign Application Priority Data

Jun. 2, 2009 (TW) .............................. 98118121 A

(51) Int. Cl.
*F21V 7/20* (2006.01)
(52) U.S. Cl. ........ 362/218; 362/294; 362/183; 362/192; 362/373
(58) Field of Classification Search .................. 362/240, 362/249.02, 218, 294, 373, 183, 192
See application file for complete search history.

(56) References Cited

U.S. PATENT DOCUMENTS

| | | | | |
|---|---|---|---|---|
| 4,254,453 A * | 3/1981 | Mouyard et al. | | 362/240 |
| 6,942,361 B1 * | 9/2005 | Kishimura et al. | | 362/240 |
| 7,726,845 B2 * | 6/2010 | Zheng et al. | | 362/294 |
| 7,731,383 B2 * | 6/2010 | Myer | | 362/145 |
| 7,744,247 B2 * | 6/2010 | Zhang et al. | | 362/249.02 |
| 7,784,981 B2 * | 8/2010 | Xiao et al. | | 362/431 |
| 7,832,891 B2 * | 11/2010 | Zhou | | 362/192 |
| 7,832,892 B2 * | 11/2010 | Xiao et al. | | 362/192 |
| 2006/0250803 A1 * | 11/2006 | Chen | | 362/373 |
| 2007/0230185 A1 * | 10/2007 | Shuy | | 362/294 |
| 2008/0043479 A1 * | 2/2008 | Wang | | 362/373 |
| 2008/0285265 A1 * | 11/2008 | Boissevain | | 362/218 |

* cited by examiner

*Primary Examiner* — Ali Alavi
(74) *Attorney, Agent, or Firm* — Stites & Harbison PLLC; Juan Carlos A. Marquez, Esq.

(57) ABSTRACT

A solar energy street lamp structure with an air passageway is provided. The solar energy street lamp structure includes a lamp support, a photovoltaic panel, a lighting unit, and a power module. The photovoltaic panel and the lighting unit are coupled with the street lamp, respectively. The power module stores power generated by the photovoltaic panel and provides the stored power to the lighting unit. Moreover, the air passageway is formed between a first body and a second body of the lamp support to enable air circulation. Thus, heat generated by the photovoltaic panel and the lighting unit in operation can be dissipated by air circulating through the air passageway. The solar energy street lamp structure with the air passageway is capable of effective heat dissipation and therefore has an extended service life.

15 Claims, 8 Drawing Sheets

SOLAR ENERGY STREET LAMP STRUCTURE WITH AIR PASSAGEWAY

BACKGROUND OF THE INVENTION

1. Technical Field

The present invention relates to solar energy street lamp structures with air passageways. More particularly, the present invention relates to a solar energy street lamp structure having an air passageway and configured for use with solar energy street lamps.

2. Description of Related Art

As global energy reserves are gradually depleted, and environmental awareness thrives, traditional energy sources are progressively replaced by alternative ones. Of all the alternative energy sources, solar energy is the most highly developed in terms of technology and application. Therefore, in an attempt to protect the environment and save energy, almost all major countries in the world have made plans to substitute solar energy street lamps for conventional street lamps.

A solar energy street lamp operates in the following manner. A photovoltaic panel absorbs solar energy and converts the absorbed solar energy into electric power, which is then supplied to a lighting unit and drives the lighting unit to emit light. However, heat generated by the lighting unit during operation tends to accumulate in the lampshade of the solar energy street lamp and keep the lampshade in a high-temperature state for a long time. If the heat accumulated in the lampshade cannot be dissipated effectively, the lampshade may be deformed by the high heat, or even the lighting unit may be damaged and therefore fail to emit light normally, thus compromising the lighting effect of the solar energy street lamp.

However, if a heat dissipation device is added to the solar energy street lamp, the costs of the solar energy street lamp must be increased. Moreover, a general heat dissipation device for use with the solar energy street lamp typically uses a motor to drive a fan and thus accelerates air circulation in the lampshade for enhanced heat dissipation. Therefore, the motor will consume the electric power generated by the photovoltaic panel and may leave the lighting unit with insufficient electricity. As a result, the solar energy street lamp may have a shortened lighting duration and function poorly.

BRIEF SUMMARY OF THE INVENTION

Hence, it is an objective of the present invention to provide a solar energy street lamp structure with an air passageway configured for enabling air circulation such that heat generated by a photovoltaic panel and a lighting unit can be dissipated rapidly via the air passageway, thereby extending the service life of the solar energy street lamp structure.

It is another objective of the present invention to provide a solar energy street lamp structure with an air passageway configured for facilitating heat dissipation such that no additional heat dissipation devices are needed, and therefore the costs of the solar energy street lamp structure will not be increased.

In order to achieve the above and other objectives, the present invention provides a solar energy street lamp with an air passageway, wherein the solar energy street lamp structure includes a lamp support, at least one photovoltaic panel, at least one lighting unit, and a power module. The lamp support includes a frame; a first body coupled with the frame and having a first surface and a second surface facing away from the first surface; a second body disposed opposite the first body and having a third surface and a fourth surface, wherein the third surface is opposite the second surface, and the fourth surface faces away from the third surface; and at least one connection unit for connecting the second surface and the third surface so as to form the air passageway between the first body and the second body for air to circulate through. The at least one photovoltaic panel is provided on the fourth surface. The at least one lighting unit is provided on the first surface. The power module includes an electric power storage unit and a control unit. The electric power storage unit is electrically connected to the at least one photovoltaic panel so as to store electric power generated thereby and is electrically connected to the at least one lighting unit so as to provide the stored electric power thereto. The control unit is connected in electrical signal communication with the at least one photovoltaic panel, the at least one lighting unit, and the electric power storage unit so as to turn on or off the at least one lighting unit and control charging and discharging of the electric power storage unit.

Implementation of the present invention at least provides the following inventive effects:

1. The air passageway formed in the solar energy street lamp structure enables immediate removal of heat generated by the at least one photovoltaic panel and the at least one lighting unit, thus extending the service life of the solar energy street lamp structure; and 2. As the solar energy street lamp structure can achieve heat dissipation without additional heat dissipation devices, the costs of the solar energy street lamp structure can be minimized.

BRIEF DESCRIPTION OF THE SEVERAL VIEWS OF THE DRAWINGS

A detailed description of further features and advantages of the present invention is given below so that a person skilled in the art is enabled to understand and implement the technical contents of the present invention and readily comprehend the objectives and advantages thereof by reviewing the teachings disclosed herein and the appended claims in conjunction with the accompanying drawings, wherein:

DETAILED DESCRIPTION OF THE INVENTION

Figure 1A:
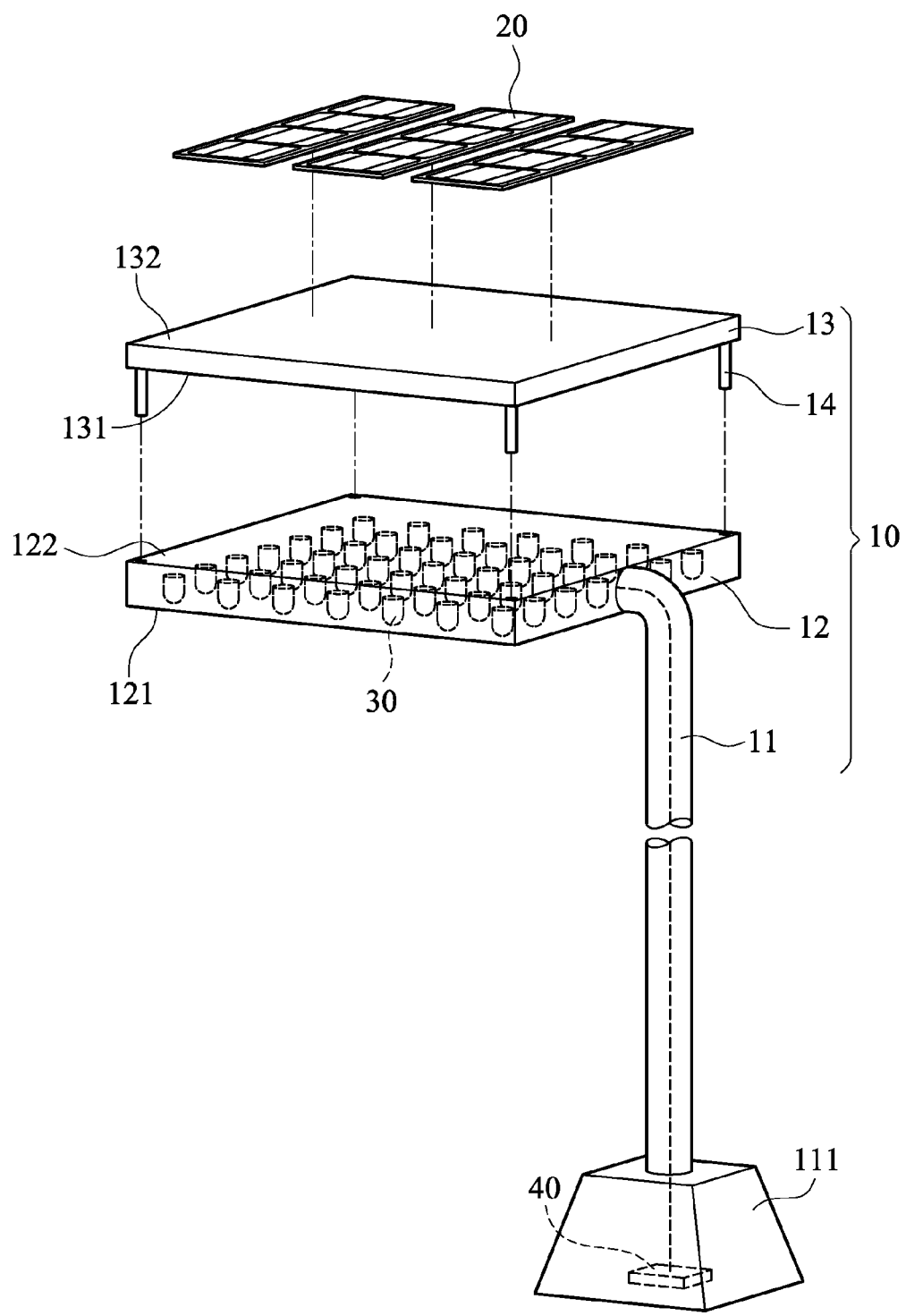
FIG. 1A is an exploded perspective view of a solar energy street lamp structure according to an embodiment of the present invention.

Referring to FIG. 1A, a solar energy street lamp structure 100 with an air passageway includes a lamp support 10, at least one photovoltaic panel 20, at least one lighting unit 30, and a power module 40.

Figure 1B:
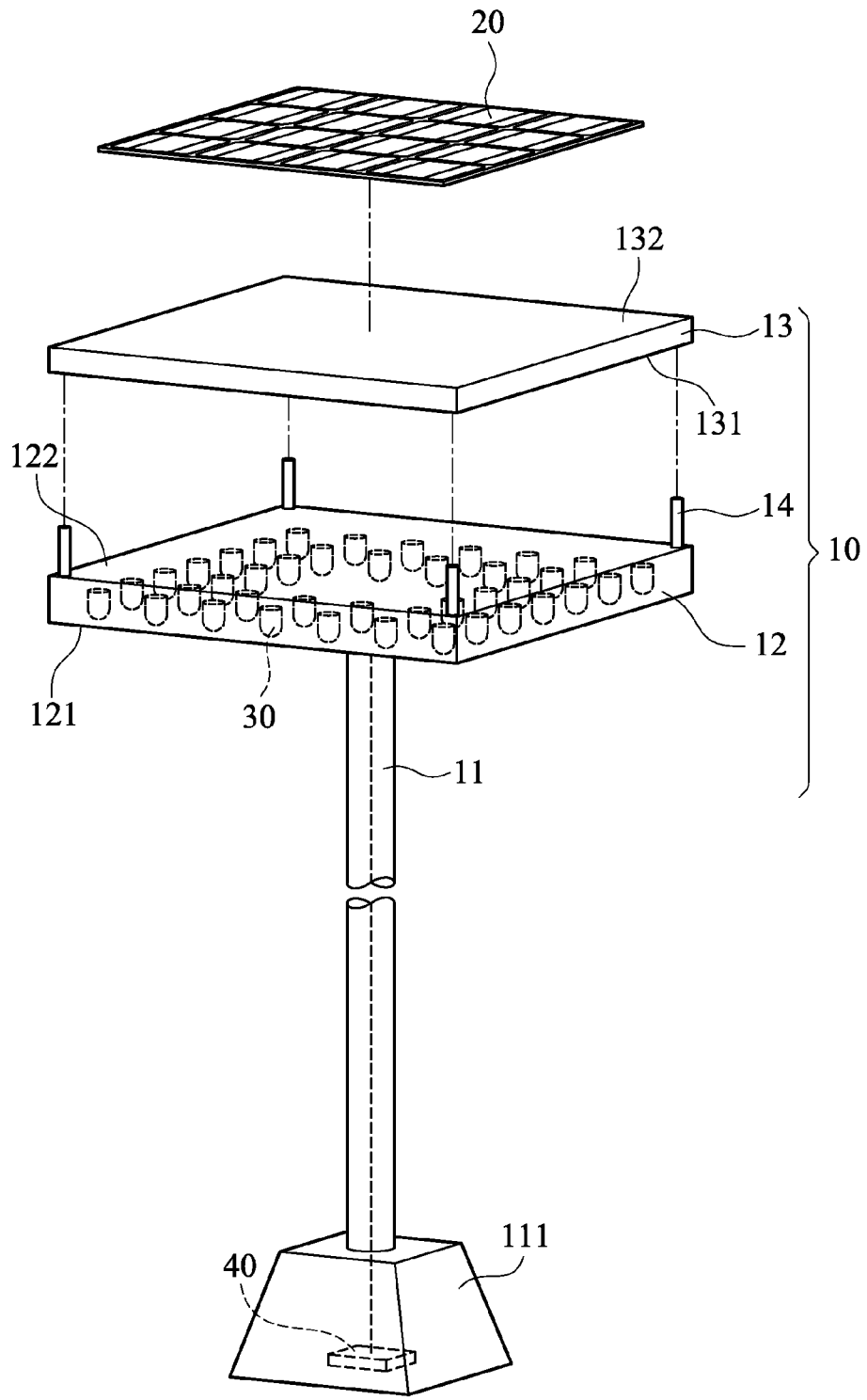
FIG. 1B is an exploded perspective view of a solar energy street lamp structure according to another embodiment of the present invention.

As shown in FIG. 1A and FIG. 1B, the lamp support 10 includes a frame 11, a first body 12, a second body 13, and at least one connection unit 14. The frame 11 includes a base 111, and the base 111 is coupled with a bottom end of the frame 11 and configured for receiving the power module 40.

As shown in FIG. 1A and FIG. 1B, the first body 12 has a first surface 121 and a second surface 122. The second surface 122 faces away from the first surface 121; in other words, the second surface 122 and the first surface 121 are an upper surface and a lower surface of the first body 12, respectively. The frame 11 is coupled with the first body 12. For example, the frame 11 is coupled with a lateral end portion of the first body 12, as shown in FIG. 1A, or is coupled with a central portion of the first surface 121, as shown in FIG. 1B.

As shown in FIG. 1A and FIG. 1B, the second body 13 is disposed opposite the first body 12 and has a third surface 131 and a fourth surface 132. The third surface 131 is disposed opposite the second surface 122 of the first body 12. The fourth surface 132 faces away from the third surface 131.

Figure 2A:
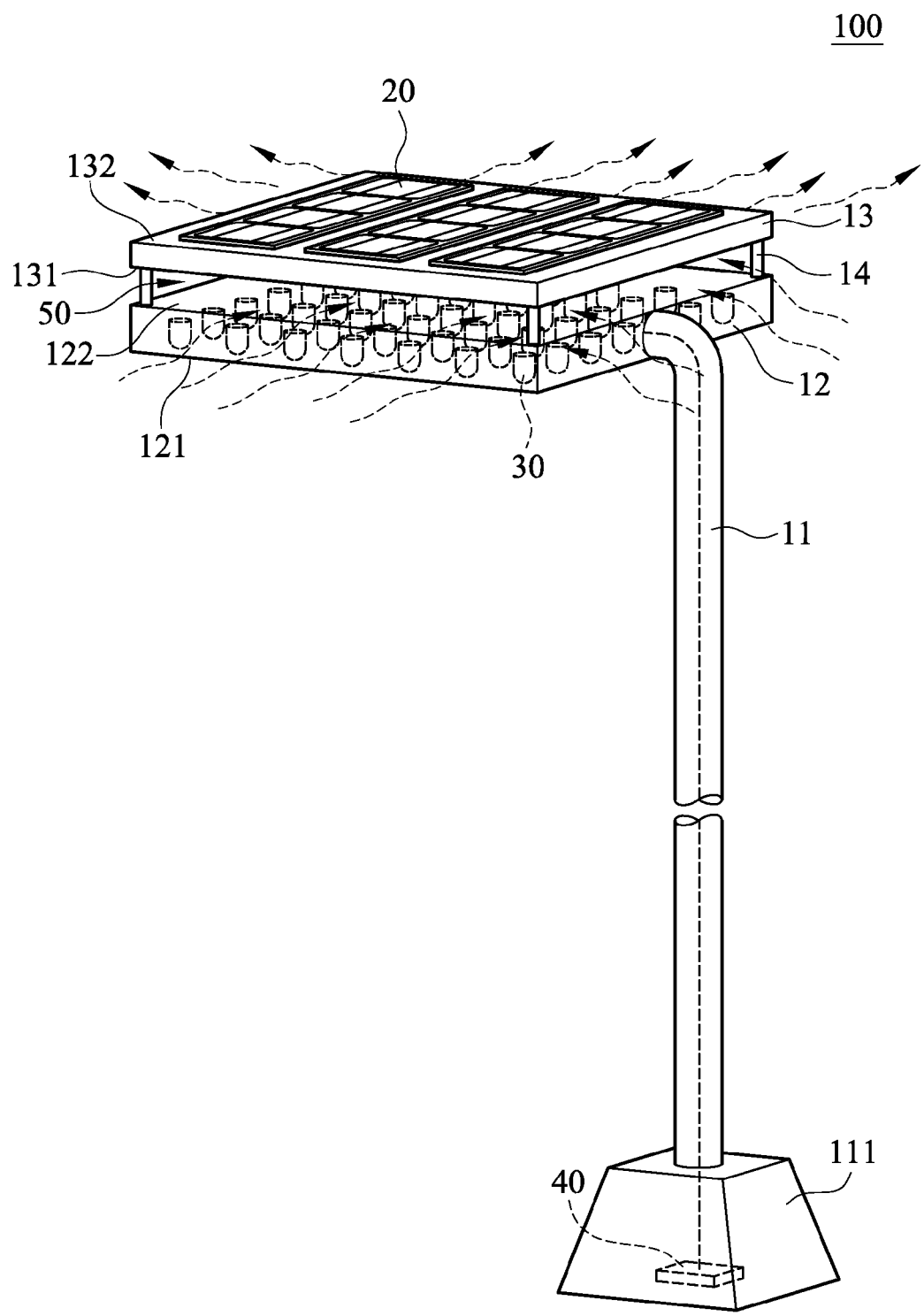
FIG. 2A is an assembled perspective view of the solar energy street lamp structure shown in FIG. 1A.
Figure 2B:
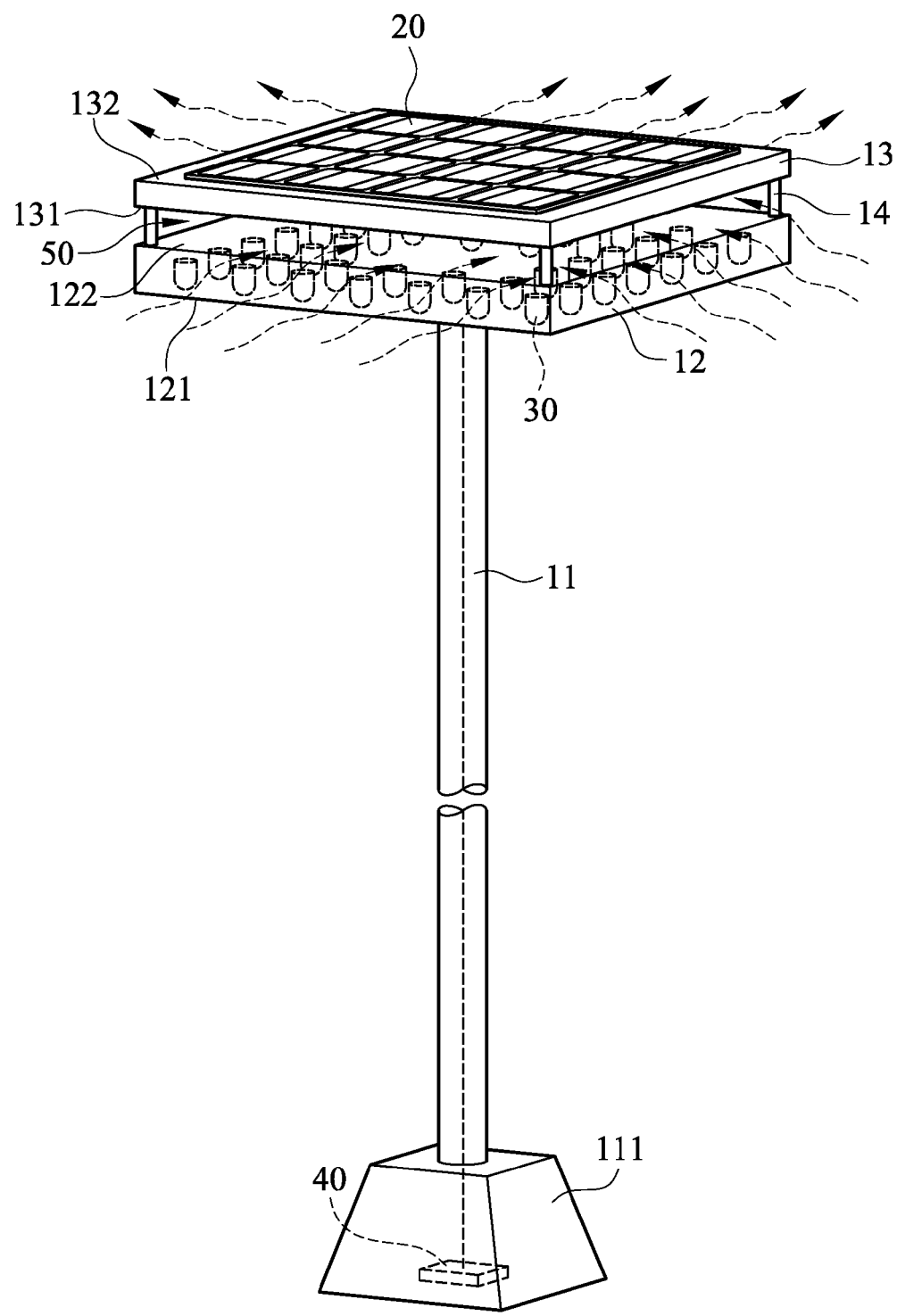
FIG. 2B is an assembled perspective view of the solar energy street lamp structure shown in FIG. 1B.

As shown in FIG. 1A, the at least one connection unit 14 is integrally formed with the second body 13. Alternatively, as shown in FIG. 1B, the at least one connection unit 14 is integrally formed with the first body 12. Referring to FIG. 2A and FIG. 2B, the at least one connection unit 14 is configured for connecting the second surface 122 of the first body 12 and the third surface 131 of the second body 13 such that the first body 12 and the second body 13 are coupled with each other. Moreover, due to the existence of the at least one connection unit 14, an air passageway 50 is formed between the first body 12 and the second body 13 coupled together. Thus, the solar energy street lamp structure 100 is provided with the air passageway 50 for air to circulate through.

As shown in FIG. 2A and FIG. 2B, the at least one photovoltaic panel 20 is provided on the fourth surface 132 of the second body 13. The solar energy street lamp structure 100 may have a plurality of photovoltaic panels 20, as shown in FIG. 2A, or use a single large-area photovoltaic panel 20, as shown in FIG. 2B, so as to increase the area for absorbing solar energy and thereby enhance power generation efficiency of the at least one photovoltaic panel 20.

In addition, the at least one photovoltaic panel 20 of the solar energy street lamp structure 100 can be, but is not limited to, a crystalline silicon-based photovoltaic panel, a thin-film photovoltaic panel, an electrochemical photovoltaic panel, or a compound-semiconductor photovoltaic panel, as determined by cost considerations.

As shown in FIG. 2A and FIG. 2B, the at least one lighting unit 30 is provided on the first surface 121 of the first body 12 and configured for illumination. The at least one lighting unit 30 can be a light-emitting diode. The number of the at least one lighting unit 30 of the solar energy street lamp structure 100 may vary as needed so as to provide the desired luminosity. For example, the number of the at least one lighting unit 30 will be different for highway illumination and urban street illumination due to the different luminosity requirements.

As the at least one photovoltaic panel 20 continues absorbing solar energy, or as the at least one lighting unit 30 continues emitting light, the temperature of the at least one photovoltaic panel 20 or of the at least one lighting unit 30 keeps rising. Heat generated by the at least one photovoltaic panel 20 is transferred from the fourth surface 132 to the third surface 131 of the second body 13. Similarly, heat generated by the at least one lighting unit 30 is transferred from the first surface 121 to the second surface 122 of the first body 12. Now that the air passageway 50 is formed between the first body 12 and the second body 13, the heat transferred to the second surface 122 and the third surface 131 can be removed rapidly by air flowing through the air passageway 50, thereby cooling down the at least one photovoltaic panel 20 and the at least one lighting unit 30, allowing them to operate within a normal temperature range.

Figure 3A:
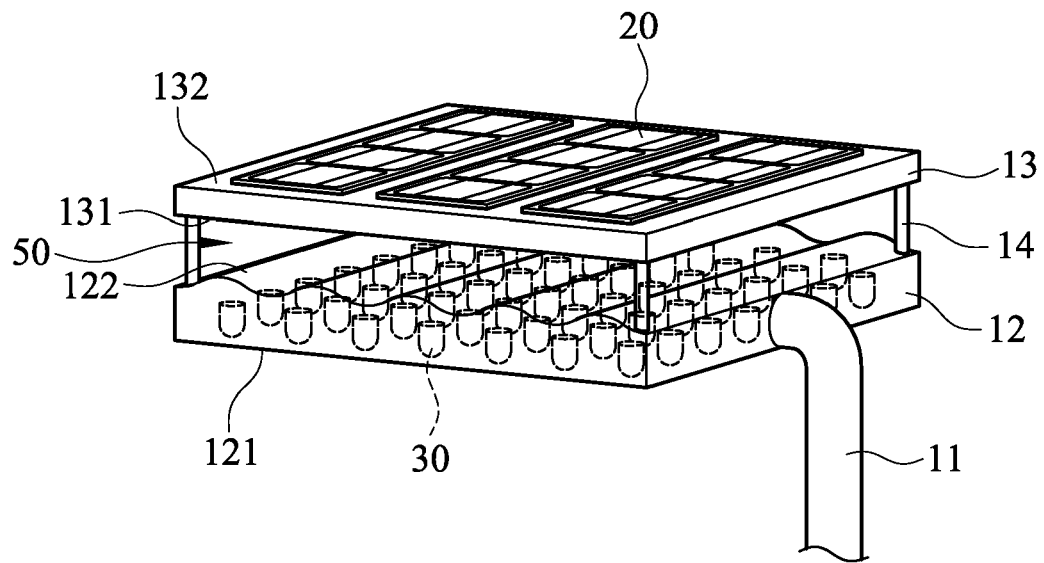
FIG. 3A is a perspective view of an embodiment of a first body and a second body of the present invention.
Figure 3B:
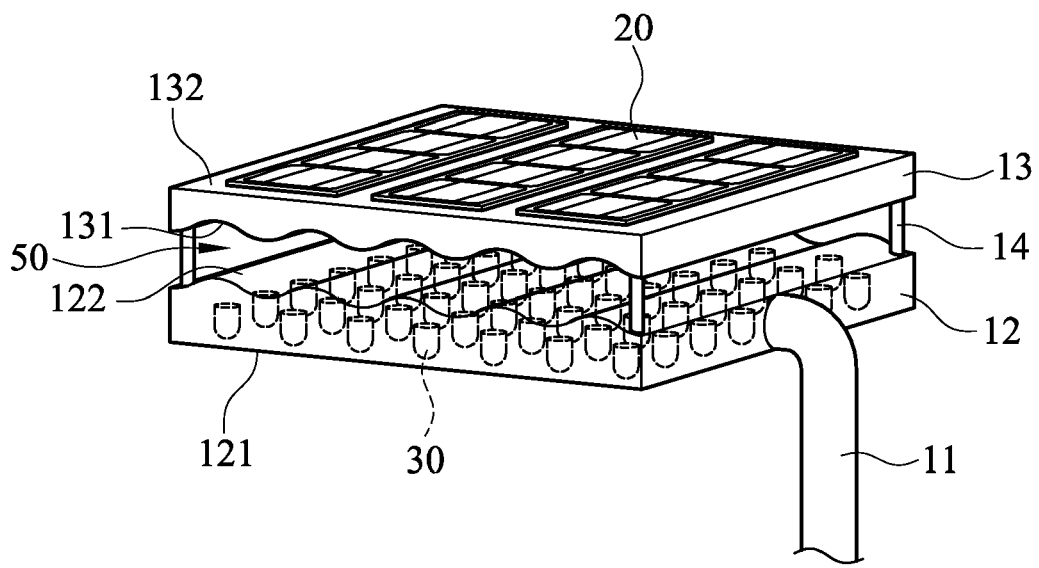
FIG. 3B is a perspective view of another embodiment of the first body and the second body of the present invention.

Referring to FIG. 3A, the second surface 122 of the first body 12 is a wavy surface configured for increasing area of contact between the second surface 122, which is an inner wall of the air passageway 50, and air flowing through the air passageway 50, so as to enhance heat dissipation efficiency. Referring to FIG. 3B, the third surface 131 of the second body 13 is also formed as a wavy surface to significantly increase area of contact between the third surface 131, which is another inner wall of the air passageway 50, and air flowing through the air passageway 50, thereby accelerating heat dissipation.

Figure 4A:
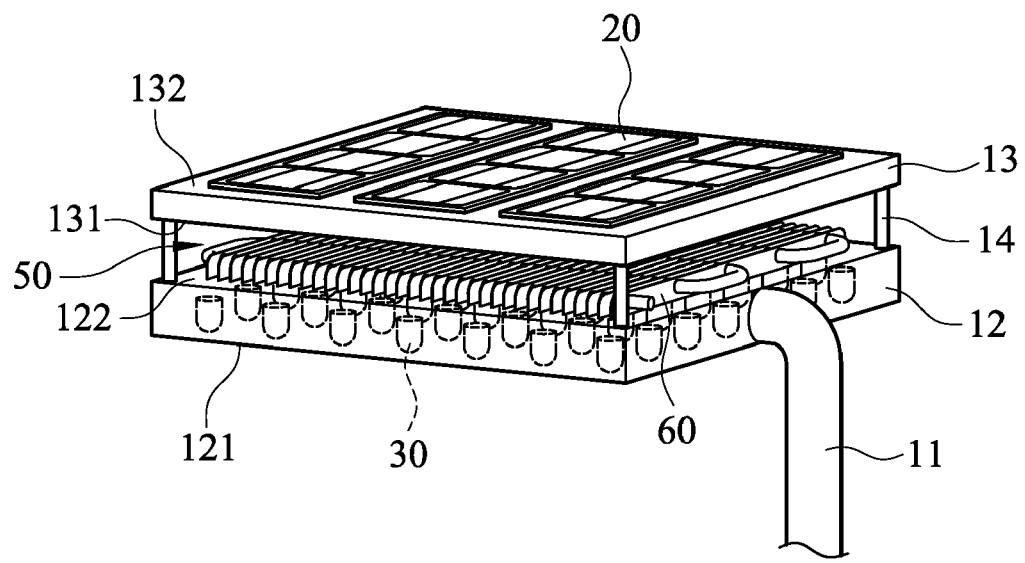
FIG. 4A is a perspective view of yet another embodiment of the first body and the second body of the present invention.

Referring to FIG. 4A, the second surface 122 of the first body 12 is thermally coupled with a plurality of cooling fins 60 so as effectively dissipate heat transferred to the second surface 122 from the first surface 121 and thereby facilitate heat dissipation from the at least one lighting unit 30 on the first surface 121.

Figure 4B:
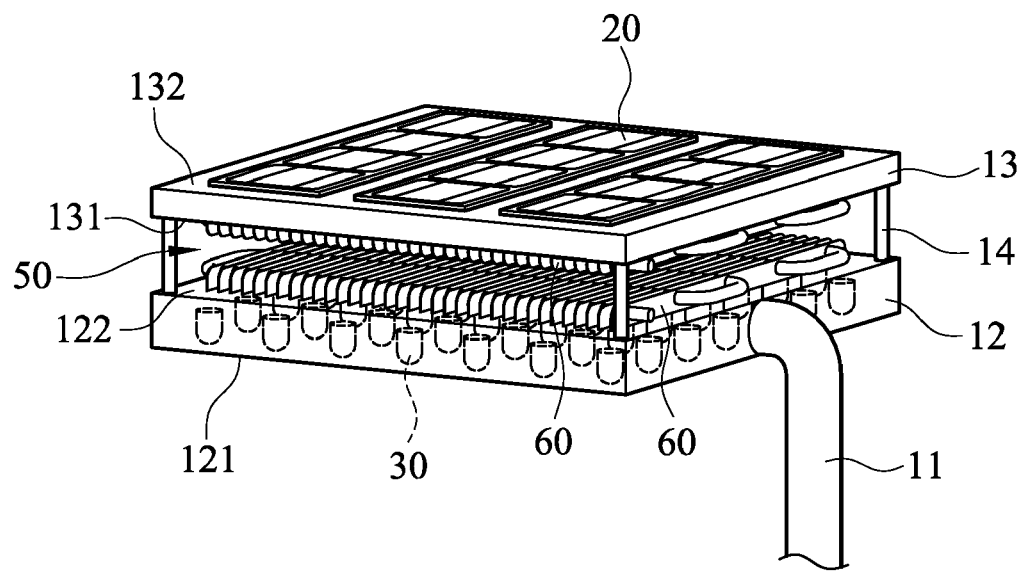
FIG. 4B is a perspective view of still another embodiment of the first body and the second body of the present invention.

Referring to FIG. 4B, the third surface 131 of the second body 13 is also thermally coupled with a plurality of cooling fins 60. Thus, heat transferred from the fourth surface 132 to the third surface 131 can be dissipated effectively to allow rapid dissipation of heat generated by the at least one photovoltaic panel 20. As the cooling fins 60 are provided on the inner walls of the air passageway 50, air circulating through the air passageway 50 will enhance the heat dissipation effect of the cooling fins 60 and hence of the solar energy street lamp structure 100.

With the air passageway 50, the solar energy street lamp structure 100 can rapidly dissipate heat generated by the at least one lighting unit 30 and the at least one photovoltaic panel 20. Since the solar energy street lamp structure 100 can achieve effective heat dissipation without resorting to additional heat dissipation devices, not only are the costs of the solar energy street lamp structure 100 lowered, but also the service life of the at least one lighting unit 30 and of the at least one photovoltaic panel 20 is extended.

Figure 5:
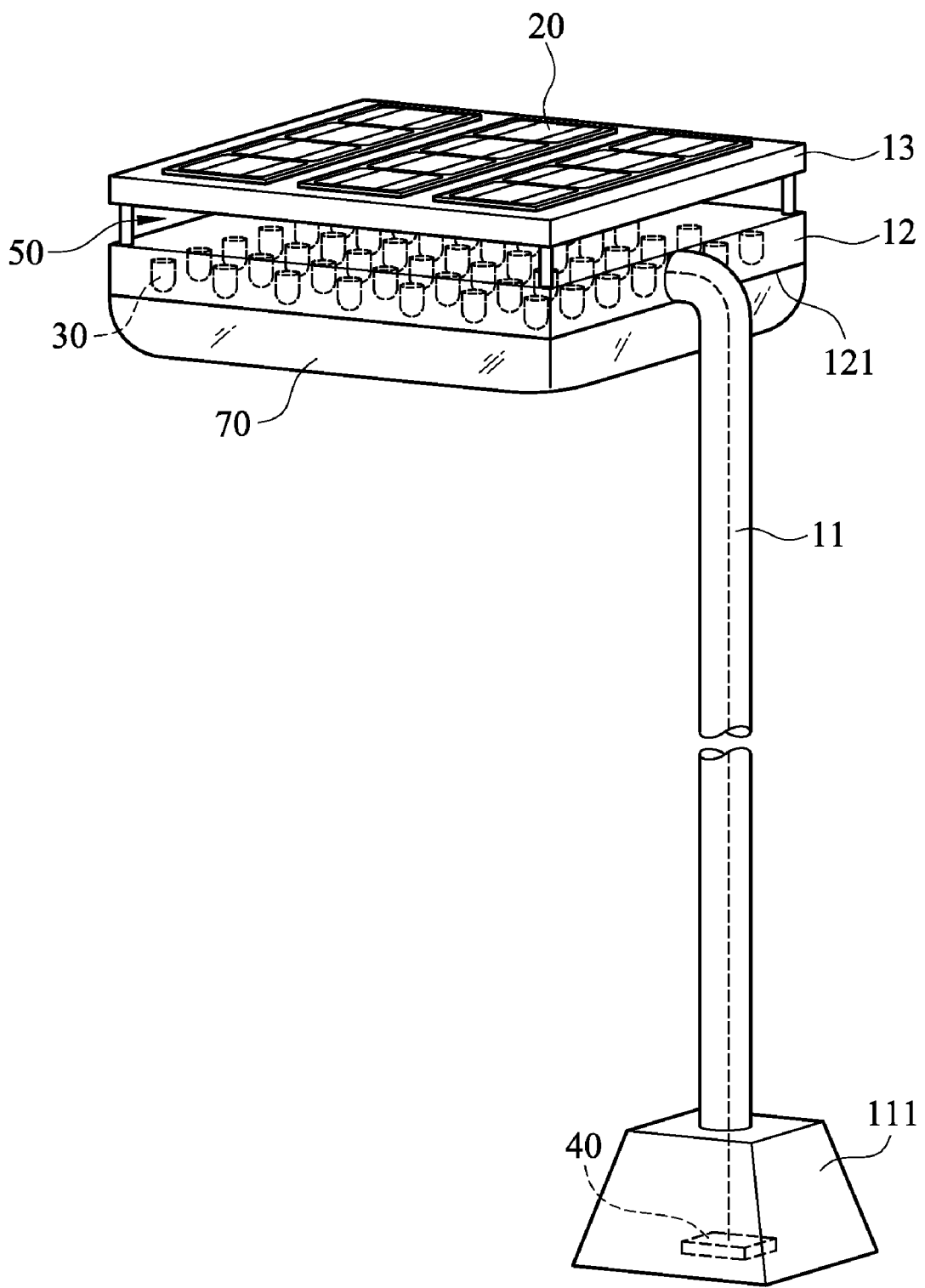
FIG. 5 is a perspective view of a solar energy street lamp structure according to a further embodiment of the present invention.

Referring to FIG. 5, the solar energy street lamp structure 100 further includes a lampshade 70 coupled with and covering the first surface 121 of the first body 12 such that light emitted by the at least one lighting unit 30 on the first surface 121 passes through the lampshade 70. The lampshade 70 is installed to protect the at least one lighting unit 30 from external moisture.

Figure 6A:
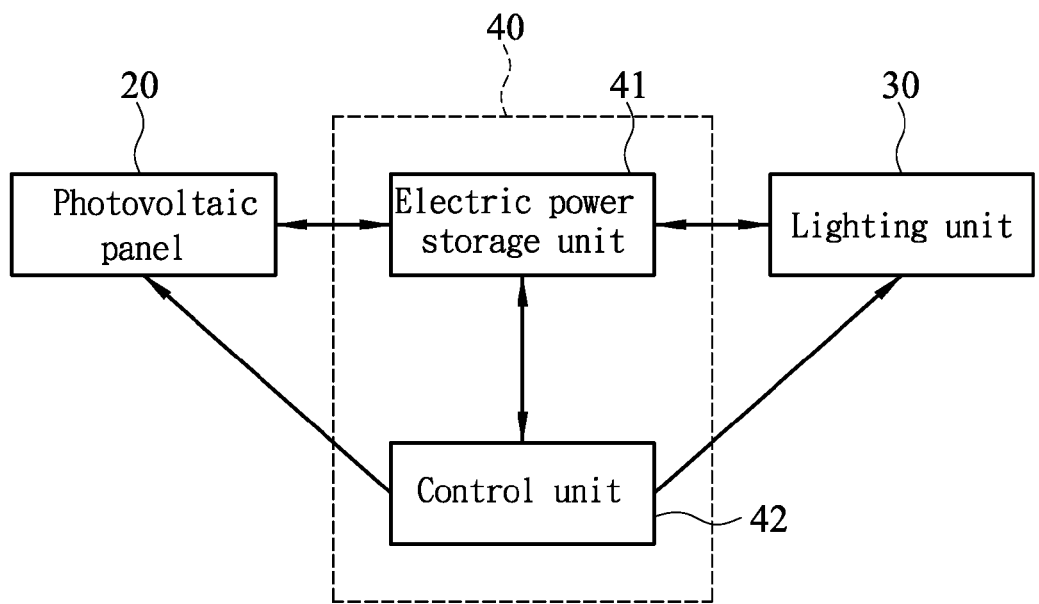
FIG. 6A is a circuit block diagram of the solar energy street lamp structure according to the present invention.

Referring to FIG. 6A, the power module 40 includes an electric power storage unit 41 and a control unit 42. The electric power storage unit 41 is electrically connected to the at least one photovoltaic panel 20 so as to store electric power generated thereby. The electric power storage unit 41 is also electrically connected to the at least one lighting unit 30 so as to supply necessary electric power to the at least one lighting unit 30 and thus drive the at least one lighting unit 30 to emit light.

As shown in FIG. 6A, the control unit 42 is connected in electrical signal communication with the at least one photovoltaic panel 20, the at least one lighting unit 30, and the electric power storage unit 41 so as to turn on or off the at least one lighting unit 30 and control charging and discharging of the electric power storage unit 41, thereby preventing the electric power storage unit 41 from being overcharged and consequently failing sooner than it should.

Figure 6B:
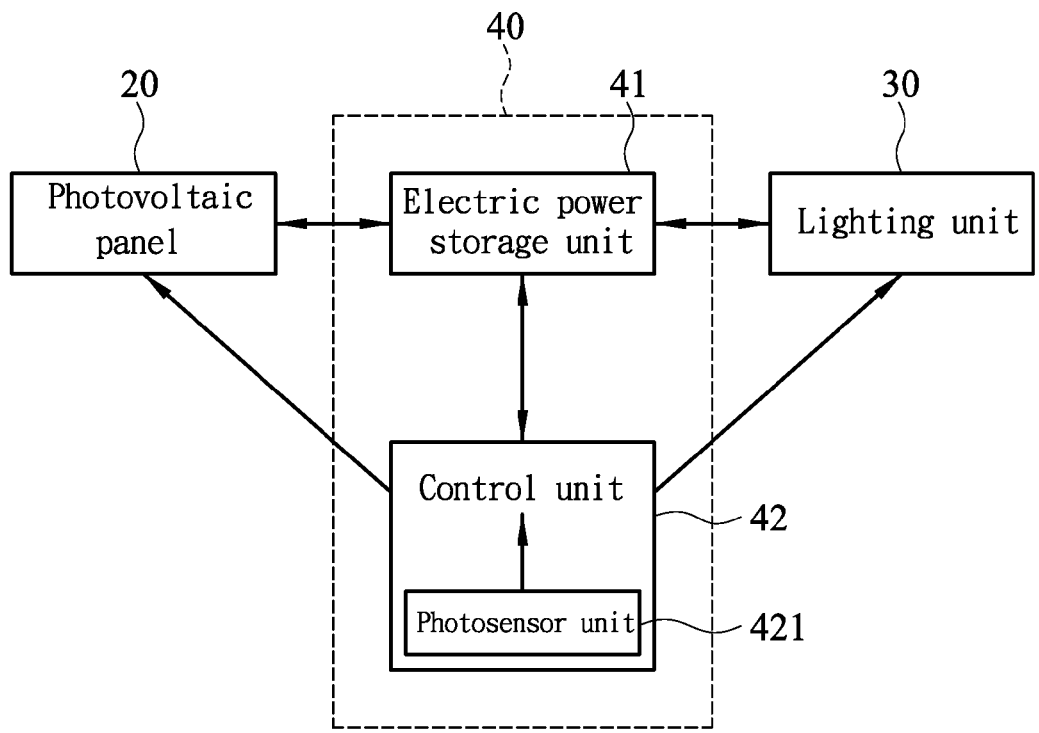
FIG. 6B is an alternative circuit block diagram of the solar energy street lamp structure according to the present invention.

Referring to FIG. 6B, the control unit 42 further includes a photosensor unit 421. The control unit 42 uses the photosensor unit 421 to detect light intensity around the solar energy street lamp structure 100 and determines accordingly when to turn on or off the at least one lighting unit 30 such that the at least one lighting unit 30 is switched on or off automatically.

The foregoing embodiments are illustrative of the characteristics of the present invention so as to enable a person skilled in the art to gain insight into the disclosure of the present invention and be capable of implementing the present invention accordingly, but are not intended to restrict the scope of the present invention. Hence, all equivalent modifications and variations made in the foregoing preferred embodiments without departing from the spirit and principle of the present invention should fall within the scope of the appended claims.

What is claimed is:

1. A solar energy street lamp structure with an air passageway, the solar energy street lamp structure comprising:
    a lamp support comprising:
        a frame;
        a first body coupled with the frame and having a first surface and a second surface facing away from the first surface;
        a second body disposed opposite the first body and having a third surface opposite the second surface and a fourth surface facing away from the third surface; and
        at least a connection unit for connecting the second surface and the third surface such that the air passageway is formed between the first body and the second body for air to circulate through;
    at least a photovoltaic panel provided on the fourth surface;
    at least a lighting unit provided on the first surface; and
    a power module comprising:
        an electric power storage unit electrically connected to the at least a photovoltaic panel so as to store electric power generated thereby, the electric power storage unit being further electrically connected to the at least a lighting unit so as to supply the stored electric power thereto; and
        a control unit connected in electrical signal communication with the at least a photovoltaic panel, the at least a lighting unit, and the electric power storage unit so as to turn on or off the at least a lighting unit and control charging and discharging of the electric power storage unit.

2. The solar energy street lamp structure of claim 1, wherein the frame comprises a base coupled with a bottom end of the frame and configured, and the power module is provided in the base.

3. The solar energy street lamp structure of claim 1, wherein the at least a connection unit is integrally formed with the first body.

4. The solar energy street lamp structure of claim 1, wherein the at least a connection unit is integrally formed with the second body.

5. The solar energy street lamp structure of claim 1, wherein the second surface is a wavy surface.

6. The solar energy street lamp structure of claim 1, wherein the third surface is a wavy surface.

7. The solar energy street lamp structure of claim 1, wherein the second surface is thermally coupled with a plurality of cooling fins.

8. The solar energy street lamp structure of claim 1, wherein the third surface is thermally coupled with a plurality of cooling fins.

9. The solar energy street lamp structure of claim 1, wherein the at least a photovoltaic panel is a crystalline silicon-based photovoltaic panel.

10. The solar energy street lamp structure of claim 1, wherein the at least a photovoltaic panel is a thin-film photovoltaic panel.

11. The solar energy street lamp structure of claim 1, wherein the at least a photovoltaic panel is an electrochemical photovoltaic panel.

12. The solar energy street lamp structure of claim 1, wherein the at least a photovoltaic panel is a compound-semiconductor photovoltaic panel.

13. The solar energy street lamp structure of claim 1, wherein the at least a lighting unit is a light-emitting diode.

14. The solar energy street lamp structure of claim 1, further comprising a lampshade coupled with and covering the first surface such that light emitted by the at least a lighting unit passes through the lampshade.

15. The solar energy street lamp structure of claim 1, wherein the control unit comprises a photosensor unit.

* * * * *